United States Patent [19]
Schwamborn et al.

[11] Patent Number: 5,896,894
[45] Date of Patent: Apr. 27, 1999

[54] ELONGATED TUBULAR HOUSING FOR MONITORING SYSTEMS

[75] Inventors: Klaus Schwamborn; Manfred Sikora; Walter Steffes, all of Wipperfuerth, Germany

[73] Assignee: Eilentropp KG, Wipperfuerth, Germany

[21] Appl. No.: 08/762,348

[22] Filed: Dec. 9, 1996

[30] Foreign Application Priority Data

Dec. 15, 1995 [DE] Germany ............... 195 47 031

[51] Int. Cl.⁶ ........................................ F16L 57/00
[52] U.S. Cl. ................... 138/110; 138/129; 138/150; 138/177; 138/DIG. 3
[58] Field of Search ................. 138/149, 129, 138/141, 150, 177, DIG. 3, DIG. 5, 116, 110

[56] References Cited

U.S. PATENT DOCUMENTS

| | | | |
|---|---|---|---|
| 2,176,558 | 10/1939 | Lockey | 138/150 |
| 3,098,444 | 7/1963 | Walkey et al. | 138/177 |
| 3,773,088 | 11/1973 | Ball | 138/129 |
| 3,905,775 | 9/1975 | Sowards et al. | 138/177 |
| 3,946,762 | 3/1976 | Green | 138/177 |
| 4,484,022 | 11/1984 | Eilentropp . | |
| 4,682,632 | 7/1987 | Wiedenhoff et al. | 138/150 |
| 4,791,966 | 12/1988 | Eilentropp | 138/DIG. 3 |
| 4,950,103 | 8/1990 | Justice | 138/177 |
| 5,497,809 | 3/1996 | Wolf | 138/DIG. 3 |
| 5,603,358 | 2/1997 | Lepoutre | 138/177 |

FOREIGN PATENT DOCUMENTS

| | | |
|---|---|---|
| 32 14 447 C2 | 10/1983 | Germany . |
| 44 14 052 A1 | 10/1995 | Germany . |
| 562 098 | 2/1973 | Switzerland . |

Primary Examiner—Denise L. Ferensic
Assistant Examiner—James F. Hook
Attorney, Agent, or Firm—Griffin, Butler, Whisenhunt & Szipl, LLP

[57] ABSTRACT

Recesses or openings (4) are arranged in a wall of an elongated tubular covering (3) made of resinous plastics that are resistant to temperature stresses and/or aggressive media; these openings are covered from the outside by a microporous layer (5) made of a fluoropolymer that is resistant to high temperatures.

14 Claims, 1 Drawing Sheet

ELONGATED TUBULAR HOUSING FOR MONITORING SYSTEMS

BACKGROUND OF THE INVENTION

This invention relates to elongated coverings made of resinous plastics that are resistant to temperature stresses and/or aggressive media.

As new fields of application continue to be found for products already on the market, the characteristics of these products must be adapted to meet market requirements. Thus, to an increasing extent, materials that are resistant to high temperatures, generally based on fluoropolymers, are being used to insulate or cover electrical cable and wiring, e.g. in what is known as heating cable, as well as in the field of sensor technology, where temperatures in excess of 300° C. must be reckoned with. In the automobile industry, for example, this applies to lead wiring for lambda probes, which, in combination with regulated catalytic converters, ensure that exhaust emission values are maintained at a low levels.

Other applications, such as taking samples in the chemicals industry, use small, media-conducting pipes that are exposed to elevated temperatures, but it is especially important that their functionality not be affected by ambient aggressive media. Therefore, for all these applications, it has long been known that fluoropolymers, which cannot be worked from a melt, may be used as insulation/covering for electrical cable and wiring, and that tube walls can be manufactured using such materials. It has proven particularly advantageous in this regard to use the fluoropolymer in strip form for the purposes specified above; the material of the strip may be sintered or unsintered (Swiss patent CH-PS 562 098; German patent DE-PS 32 14 447).

However, there are occasions, as in sensor technology, when it is important to have access to comparative values from the outside, at a measuring point, in order to regulate an operating system after comparing desired and actual values. This is the case, for example, with the lambda probe mentioned above, with which, essentially, a suitably responsive electrode extends into a flow of exhaust gas exiting from an engine block; one end of the electrode being exposed to the flow of exhaust gas, while the other end is in contact with outside air. This type of regulating system must be protected from dirt accumulation and splashed water, or one disadvantage is that it becomes increasingly difficult to make sufficient oxygen, for comparison, available to the regulating system from ambient air. In some cases, efforts to use open gusset space of the electrical conductors in the supply leads to this end have resulted in an introduction of splashed water, which has had a negative impact on the regulating process.

If an elongated tubular covering itself is used as a measurement probe or sensor, such as for monitoring electrical equipment, for pipelines and similar devices, e.g. to detect liquids or gases seeping from or penetrating into the system, and to report locations of entry or exit to a central monitoring station, an important thing is often to select a medium to perform this monitoring function so that false alerts are avoided.

SUMMARY

To solve the problem outlined above, the invention provides for recesses or openings in a wall distributed over a surface of a covering, which are covered from the outside by a microporous layer made of a fluoropolymer that is resistant to high temperatures. An active exchange covering of similar design, e.g. used as an electrical insulator for a supply lead for a lambda probe mentioned above, unproblematically provides a supply of outside air through this feeder; the filtering action of the microporous covering keeps the required air flow free of small dust particles and splashed water. The regulating effect is thereby improved, and the life of the regulating device is increased.

This filtering effect, however, can also be applied advantageously in cases of monitoring systems in which an elongated tubular covering pursuant to the invention, with or without an electrical wire or fiber optic cable at its core, serves directly as a measuring probe, measuring sensor, or monitoring device. For example, in a control line, which may consist of a conduit manufactured pursuant to the invention, running parallel to an oil pipeline, dirt and water are prevented from penetrating into the monitoring system in case of an oil leak. It is easier to monitor a leak, and the location of the damage is easily determined; above all, however, the operational security and reliability of the monitoring system is improved.

DESCRIPTION OF PREFERRED EMBODIMENTS

Figure 1:
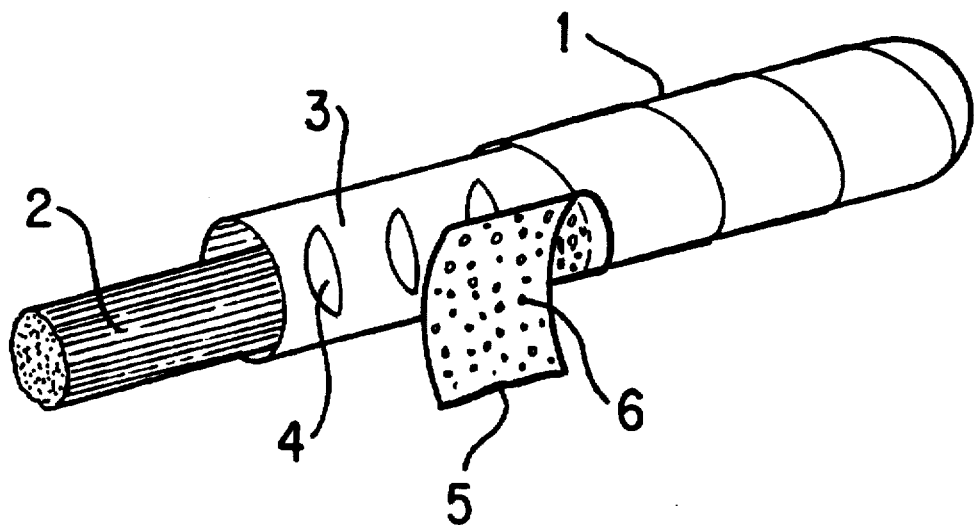
FIG. 1 is a perspective view of a first tubular housing of the present invention.

The use of the tubular covering pursuant to the invention as depicted, in the same or similarly devised situations, means that the materials used must be adapted to the respective environmental conditions. Therefore, in implementing the invention, it is advantageous for the resinous plastic that is resistant to temperature stresses and/or aggressive media be a polytetrafluoroethylene that cannot be worked from a melt.

In further carrying out the invention, polytetrafluoroethylene that cannot be worked from a melt has also proven advantageous for use in the microporous layer, in its pure form or in a modified form as well, with no more than 2% by weight of fluoromonomers. Such fluoromonomers can be based on hexafluoropropylene, perfluorobutylethylene, or perfluoroalkyl-perfluorovinyl ether, whose perfluoroalkyl groups contain 1 to 12 carbon atoms.

A further advantageous option is to use the polytetrafluoroethylene in a form ranging from powder to granulate, in a mixture of 1 to 30% by weight thermoplastic, moldable fluoropolymers. The thermoplastic, moldable fluoropolymers used as components may be based on polyvinylidenefluoride and polychlorotrifluoroethylene, for example, or thermoplastic copolymers of vinylidene-fluoride and chlorotrifluoroethylene. Fluoropolymers that can be processed under heat, however, also include the copolymer tetrafluoroethylene/hexafluoropropylene (FEP) and a tetrafluoroethylene-perfluoroalkylvinyl ether copolymer (TFA/PFA).

These components in the basic material of the covering, made pursuant to the invention, act to build bridges, on the one hand, between the particles, ranging from powder to granulate form, of the polytetrafluoroethylene and, on the other hand, as adhesion bridges in a boundary area at a surface of the tubular covering and the surface of the microporous layer covering the recesses or openings in the covering. These adhesion bridges are also advantageous if, as is also provided pursuant to the invention, the microporous layer consists of one or more plies of wound strip or foil. In this case, they contribute additionally to a bonding or conglutination of the individual layers of the wound material.

Since, pursuant to the invention, the microporosity of the covering is important, this feature is achieved by means of stretching the strip or foil at a rate of stretching of up to 2,000%, preferably ranging between 300 and 1,000%, is advantageous. The strip material may be sintered at the same time as it is stretched, in a direction of the strip or perpendicular thereto, or in a subsequent stage of carrying out the process, a sintering step also serves to increase the mechanical strength of the material.

A thickness of the stretched and advantageously also sintered strip, or a corresponding sheeting or foil, is 15 to 250 μm, or preferably 30 to 100 μm.

If no fluoropolymers are added to the polytetrafluoroethylene to create adhesion bridges, in a further embodiment of the invention, it can often be advantageous at least to lute, or adhere, such materials onto the surface of the wound layer facing the tubular covering.

Figure 2:
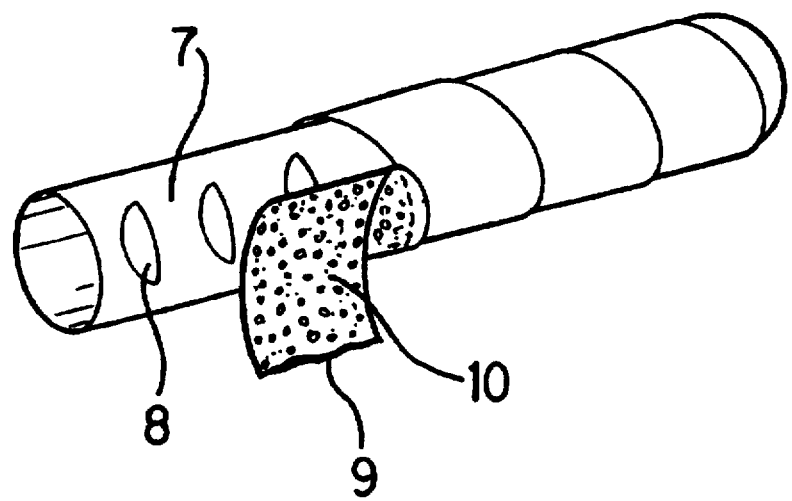
FIG. 2 is a perspective view of a second tubular housing of the present invention.

The invention is explained in further detail, with reference to the example of an embodiment illustrated in FIGS. 1 and 2.

FIG. 1 shows an electrical connecting lead 1, for example for a lambda probe (not shown), including a current-supplying wire 2 that is surrounded by an insulation 3 of polytetrafluoroethylene. Recesses or openings 4 are in the insulation 3, created by punching for example, which penetrate through the entire wall thickness of the insulation, and thus open a path for inflow of air needed for a regulating circuit. As illustrated, the recesses or openings 4 can be arranged at specific intervals in the longitudinal direction, but the arrangement of these air holes may follow the circumference of the covering, or be arranged in a spiral pattern along the surface of the elongated covering.

It is significant for the invention that the openings 4 penetrating through the insulation be covered from the outside by the wound strip 5; this wound strip 5 having micropores 6 that allow for an unimpeded inflow of air, but that prevent splashed water, dirt, and similar materials from entering the sensitive regulating circuit.

Of course, the wire 1 may also be a multiwire design, in which case the insulation 3 would then be a common covering for all, e.g. three insulated wires. Similarly, fiber optic cable may be used instead of electrical wiring; these bring made of glass or even plastic, if the ambient temperatures allow.

In contrast to FIG. 1, FIG. 2 shows a conduit or small pipe 7, the walls of which are pierced with openings 8. These openings may also be distributed in any desired pattern across the surface of the pipe, depending on requirements and an arrangement of the conduit in the environment that is to be monitored. Once again, the strip 9, which is wound in one or more layers around the conduit 7, serves to cover the openings 8, as illustrated. The micropores 10 provided in the strip allow a gaseous or liquid medium that is to be tested, for example, to enter.

Depending on the arrangement of the openings 4 or 8 on the surface of the covering, the strip may be applied along the entire length of the covering, or only in an area where the openings 4 or 8 are located if, for example, the distance between any two openings is sufficiently great.

The invention claimed is:

1. An elongated tubular covering made of resinous plastics that are resistant to temperature stresses and/or aggressive media, wherein openings are arranged along the surface of the covering, and wherein is further included a microporous layer that allows for inflow of air covering the openings from the outside, said layer being made of fluoropolymers that are resistant to high temperatures.

2. An elongated tubular covering as in claim 1, wherein the plastic that is resistant to temperature stresses and/or aggressive media is a polytetrafluoroethylene that cannot be worked from a melt.

3. An elongated tubular covering as in claim 1, wherein the fluoropolymers that are resistant to high temperatures used in the microporous layer is a polytetrafluoroethylene that cannot be worked from a melt.

4. An elongated tubular covering as in claim 3, wherein a polytetrafluoroethylene modified by no more than 2% by weight of fluoromonomers is used.

5. An elongated tubular covering as in claim 3, wherein the polytetrafluoroethylene is used in a mixture with 1 to 30% by weight of thermoplastic, moldable fluoropolymers.

6. An elongated tubular covering as in claim 1, wherein the microporous layer comprises at least one layer of a wound strip.

7. An elongated tubular covering as in claim 6, wherein the wound strip is stretched to achieve microporosity.

8. An elongated tubular covering as in claim 6, wherein the wound strip is sintered.

9. An elongated tubular covering as in claim 6, wherein the thickness of the wound strip is 15 to 250 μm, preferably 30 to 100 μm.

10. An elongated tubular covering as in claim 1, wherein the microporous layer is glued onto the surface of the covering.

11. A method of using an elongated tubular covering constructed as in claim 1, including the step of placing the tubular covering about an information transmission line to be used as insulation therefor.

12. A method of using an elongated tubular covering as in claim 11 wherein the transmission line is part of a sensor that senses through said tubular covering.

13. A method of using an elongated tubular covering constructed as in claim 1, including the step of transmitting a medium through the tubular covering, whereby the tubular covering is used as a pipe for transmitting a medium.

14. A method of using an elongated tubular covering as in claim 13 wherein the pipe is part of a sensor that senses through said tubular covering.

* * * * *